United States Patent
Higashiyama et al.

(10) Patent No.: US 7,167,092 B2
(45) Date of Patent: Jan. 23, 2007

(54) ABNORMALITY DETECTOR AND INFORMATION APPARATUS USING THE SAME

(75) Inventors: Seiji Higashiyama, Zama (JP); Yuji Nakajima, Yokohama (JP); Ken Ikoma, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 157 days.

(21) Appl. No.: 10/515,755

(22) PCT Filed: Jan. 27, 2004

(86) PCT No.: PCT/JP2004/000697

§ 371 (c)(1),
(2), (4) Date: Nov. 24, 2004

(87) PCT Pub. No.: WO2004/068431

PCT Pub. Date: Aug. 12, 2004

(65) Prior Publication Data
US 2005/0179555 A1    Aug. 18, 2005

(30) Foreign Application Priority Data
Jan. 30, 2003  (JP)  ............................. 2003-021847
Feb. 19, 2003  (JP)  ............................. 2003-041127

(51) Int. Cl.
*G08B 13/18* (2006.01)

(52) U.S. Cl. .................. 340/556; 340/541; 340/545.3; 340/545.6; 340/568.1; 340/571; 340/686.1; 340/693.5

(58) Field of Classification Search ................ 340/556, 340/557, 540, 541, 545.1, 545.3, 545.6, 545.7, 340/568.1, 568.8, 571, 686.1, 693.5, 693.11
See application file for complete search history.

(56) References Cited

U.S. PATENT DOCUMENTS 4,236,148 A * 11/1980 Gurvis ..................... 340/568.8
4,418,336 A * 11/1983 Taylor ........................ 340/571
4,631,526 A * 12/1986 Marsh ...................... 340/393.2

FOREIGN PATENT DOCUMENTS

EP    0 786 751 A    7/1997
EP    0 955 616 A    11/1999

(Continued)

OTHER PUBLICATIONS

European Search Report corresponding to application No. EP 04-70-5494 dated May 13, 2005.

(Continued)

*Primary Examiner*—Hung Nguyen
(74) *Attorney, Agent, or Firm*—RatnerPrestia

(57) ABSTRACT

An information apparatus includes a housing fitted to a support substrate and having a hole portion on a surface opposing the support substrate, a cover part fitted to the housing, and an abnormality detection part disposed inside the housing, including a first movable part urged by first urging force by the cover part in a first direction approaching the substrate support and a second movable part urged in a second direction approaching the cover part by second urging force, and detecting abnormality when either one of the first and second urging forces is released.

22 Claims, 10 Drawing Sheets

FOREIGN PATENT DOCUMENTS

| | | |
|---|---|---|
| EP | 1 174 839 A | 1/2002 |
| FR | 2 298 144 A | 8/1976 |
| JP | 48-98084 | 11/1973 |
| JP | 5-325751 | 12/1993 |
| JP | 9-212754 | 8/1997 |
| JP | 10-116393 | 5/1998 |
| JP | 2781127 | 5/1998 |
| JP | 11-283134 A | 10/1999 |
| JP | 2000-261698 | 9/2000 |
| JP | 2002-054365 A | 2/2002 |
| JP | 2003-308523 | 10/2003 |

OTHER PUBLICATIONS

International Search Report corresponding to application No. PCT/JP2004/000697 dated Apr. 20, 2004.

* cited by examiner

ABNORMALITY DETECTOR AND INFORMATION APPARATUS USING THE SAME

This application is a 371 of PCT/JP04/000697 filed on Jan. 27, 2004.

TECHNICAL FIELD

This invention relates to an abnormality detector for detecting abnormality such as theft and to an information apparatus that uses the abnormality detector and stores information to be protected from theft and leak such as personal information and authentication information.

BACKGROUND ART

Information apparatuses storing therein important information such as personal information have been wide spread in recent years. Examples of such information apparatuses include mobile telephone sets and personal computers each storing personal information such as a telephone number and a mail address, and authentication apparatus and entry/exit management apparatuses each storing biometrix information such as a fingerprint pattern and an iris pattern and authentication information such as a password to conduct personal authentication.

It is a critical problem in such an information apparatus how to prevent wrong deeds (hereinafter "tampering") by a party who attempts to illegally acquire stored information by breaking open a cover and a housing of the information apparatus and taking out a storage device storing the information from the information apparatus or by removing the information apparatus together with the housing from a wall surface. Various technologies have therefore been proposed to solve this problem.

One of such technologies proposes a construction of a housing for storing an electronic appliance in which a cover is provided to a housing, screws for fitting the housing to a wall surface cannot be handled unless the cover is open, and the cover and the housing are fixed to each other through the screws so that the housing cannot be removed from the wall surface (for example, refer to Japanese Patent No. 2,781,127).

Another construction for detecting opening/closing of a cover of an information apparatus by use of a light reception/emission portion comprising a pair of light reception portion and a light emission portion has been proposed, too (for example, refer to JP-A-5-325751). In this information apparatus, the light reception portion is formed on the housing side and a light shading protuberance is formed on the cover side in such a fashion as to cut off an optical path of the light reception/emission portion when the cover is closed. The optical path is opened when the cover is opened, the light reception portion detects the rays of light from the light emission portion, the output of the light reception/emission portion is turned ON and an abnormality signal is generated.

In the information apparatus disclosed in Japanese Patent No. 2,781,127, however, the illegal party can easily remove the information apparatus from the housing by first forcing the cover to open, finding out the screw holes for fixing the housing and thereafter removing the housing.

The information apparatus disclosed in JP-A-5-325751 can detect tampering such as breaking of the cover and can then generate the abnormality signal, it is true, but when tampering is made in such a fashion that the information apparatus itself is removed from the wall surface and taken away, the information apparatus cannot at all detect such tampering.

DISCLOSURE OF THE INVENTION

An information apparatus according to the invention comprises a housing fitted to a support substrate and having a hole portion on a surface opposing the support substrate; a cover part fitted to the housing; and an abnormality detection part disposed inside the housing, including a first movable part urged by first urging force by the cover part in a first direction approaching the substrate support and a second movable part urged in a second direction approaching the cover part by second urging force by the support substrate through the hole portion, and detecting abnormality when either one of the first and second urging forces is released.

This construction can realize an information apparatus that can detect tampering of the type that removes the housing itself of the information apparatus from the support substrate such as the wall surface and takes it away in addition to tampering of the type that removes the cover part.

The abnormality detection part may have a construction including a switch that is conductive when both first and second urging forces are imparted and becomes non-conductive when either one of the urging forces is not imparted, the construction detecting abnormality depending on the existence/absence of conduction of the switch.

This construction can provide an information apparatus capable of detecting abnormality even when the cover part is opened or when the housing is removed from the wall surface, by use of a simple construction of using the switch.

The switch may have a first contact at the first movable part and a second contact at the second movable part and is held under the state where the first contact and the second contact keep contact with each other.

According to this construction, conduction of the switch is normally ON and abnormality is detected when conduction is turned OFF. Therefore, the invention can provide an information apparatus capable of detecting abnormality even when the switch gets into trouble or the cable is disconnected.

The first movable part may be resiliently held relative to the second movable part and the second movable part may be resiliently held relative to the housing.

According to this construction, the abnormality detection part is held on the housing even when the cover part is opened or the housing is removed from the support substrate such as the wall surface. Therefore, it is possible to realize a construction having a high working factor when the cover part is opened or the housing is removed from the support substrate for maintenance and the cover is again closed or the housing is again fitted to the support substrate after completion of maintenance.

It is also possible to employ a construction in which the first movable part of the switch is pole-like and its second movable part is cylindrical, and conduction is established when the first movable part is pushed into the cylinder of the second movable part and conduction is not established when the first movable part is not pushed into the second movable part.

This construction can accomplish a construction in which the first movable part does not easily come off from the second movable part and terminals provided to the first and second movable parts can reliably be brought into mutual contact.

The abnormality detection part of the information apparatus according to the invention may include a first light reception/emission part and a second light reception/emission part each having a light emission part and a light reception part; wherein the first movable part is urged by first resilient means in the first direction and cuts off an optical path of the first light reception/emission part; the second movable part is urged by second resilient means in the second direction and cuts off an optical path of the second light reception/emission part; the first movable part moves to a position at which it does not cuts off the optical path of the first light reception/emission part when it is urged by external force stronger than the resilient force of the first resilient means in a direction opposite to the first direction; the second movable part moves to a position at which it does not cuts off the optical path of the second light reception/emission part when it is urged by external force stronger than the resilient force of the second resilient means in a direction opposite to the second direction; and the abnormality detection part detects abnormality when the optical path of at least one of the first and second light reception/emission parts is cut off.

According to this construction, the first and second movable parts are urged in mutually different directions. Therefore, when a construction in which the first movable part is pushed by the cover part and the second movable part is pushed by the support substrate such as the wall is arranged inside the information apparatus, the information apparatus can detect tampering not only when the cover part is removed but also when the housing itself of the information apparatus is removed from the support substrate such as the wall and is taken away. According to this construction, further, the outputs from the first and second light reception/emission parts are normally ON and abnormality is detected when the output changes to OFF as the optical path of either one of the first and second light reception/emission parts is cut off. Therefore, it is possible to provide the information apparatus capable of detecting abnormality even when either one of the light reception/emission parts gets into trouble or the cable is disconnected.

In the abnormality detection part, the first movable part includes a first support pole part and a first protuberance part for cutting off the optical path of the first light reception/emission part, the second movable part includes a second support pole part and a second protuberance part for cutting off the optical path of the second light reception/emission part; the abnormality detection part has a support surface for supporting the first and second support pole parts; the first and second light reception/emission parts are arranged on the support surface on the side opposite to the side where the first and second support pole parts are arranged, respectively; and first and second groove parts are defined in the support surface, the first protuberance part moves inside the first groove part and the second protuberance part moves inside the second groove part.

According to this construction, the movable part and the light reception/emission part are spaced apart through the support surface. Therefore, the possibility that dust, etc., generated by sliding between the support surface and the movable part mixes into the light reception/emission part and invites an erroneous operation can be lowered.

A construction in which a protuberance part extending in an axial direction is formed on a surface to be contacted with the support surface of at least one of the first and second support pole parts of the abnormality detection part may be employed.

According to this construction, friction due to sliding between the support surface and the first and second support pole parts can be further reduced.

At least one of the first and second resilient means of the abnormality detection parts may have a coil spring construction.

According to this construction, the information apparatus according to the invention can be realized more easily.

The information apparatus according to the invention may have a construction including an alarm generation part that generates an alarm when the abnormality detection part detects abnormality.

This construction can accomplish a construction having high security that generates the alarm when abnormality is detected.

It is further possible to employ a construction which includes a storage part for storing information to be protected and a control part connected to the storage part and to the abnormality detection part, wherein the control part erases the information to be protected, stored in the storage part, when the abnormality detection part detects abnormality.

This construction can accomplish an information apparatus having high security and low possibility of leak and theft of the information stored in the storage part.

It is further possible to employ a construction in which the information to be protected is biometrix information.

The construction can accomplish a construction that will be suitable for an authentication apparatus and an entry/exit management apparatus each of which stores biometrix information.

Next, an abnormality detector according to the invention includes a first light reception/emission part and a second light reception/emission part each having a light emission part and a light reception part; a first light shading part having first resilient means, urged by the first resilient means in a first direction and cutting off an optical path of the first light reception/emission part; and a second light shading part having second resilient means, urged by the second resilient means in a second direction different from the first direction and cutting off an optical path of the second light reception/emission part; wherein the first light shading part moves to a position at which it does not cut off the optical path of the first light reception/emission part when it is urged by external force stronger than urging force of the first resilient means, the second light shading part moves to a position at which it does not cut off the optical path of the second light reception/emission part when it is urged by external force stronger than urging force of the second resilient means, and the abnormality detector outputs an abnormality signal when the optical path of at least one of the first and second light reception/emission parts is cut off.

According to such a construction, the first and second light shading parts are urged in the mutually different directions. Therefore, when a construction in which the first light shading part is pushed by the cover part while the second light shading part is pushed by the support substrate such as the wall, for example, is arranged inside the information apparatus, tampering can be detected not only when the cover part is removed but also when the housing itself of the information apparatus is removed from the support substrate such as the wall and is taken away. According to such a construction, the outputs from the first and second light reception/emission parts are normally ON and the abnormality signal is outputted when the optical path of either one of the first and second light reception/emission parts is cut off and the output changes to OFF. It is therefore possible to provide an abnormality detector capable of generating the abnormality signal when any of the light reception/emission parts gets into trouble or the cable is disconnected.

The information apparatus of the invention may further employ a construction in which the first light shading part includes a first support pole part and a first protuberance part cutting off the optical path of the first light reception/emission part; the second light shading part includes a second support pole part and a second protuberance part cutting off the optical path of the second light reception/emission part; the abnormality detector has a support surface for supporting the first and second support pole parts; the first and second light reception/emission parts are arranged on the side opposite to the side where the first and second support pole parts are arranged with respect to the support surface, respectively; and a first groove part and a second groove part are defined in the support surface, the first protuberance part moves inside the first groove part and the second protuberance part moves inside the second groove part.

According to such a construction, because the support surface separates the light shading part from the light reception/emission part, the possibility that dust, etc generated by sliding between the support surface and the light shading part enters the light reception/emission part and invites the erroneous operation can be lowered.

A construction in which a protuberance part extending in the axial direction is formed on a surface to be contacted with the support surface of at least one of the first and second support pole parts may also be employed.

According to such a construction, friction at the time of sliding between the support surface and the first and second support pole parts can be reduced.

A construction in which at least one of the first and second resilient means is a coil spring may be employed, too.

According to such a construction, the abnormality detector of the invention can be accomplished more easily.

As described above, the abnormality detector and the information apparatus using the detector according to the invention can detect tampering not only when the cover part of the information apparatus having the abnormality detector mounted thereto is removed but also when the housing itself of the information apparatus is removed from the wall surface and is taken away.

BEST MODE FOR CARRYING OUT THE INVENTION

Next, embodiments of the invention will be explained in detail with reference to the drawings.

(First Embodiment)

An information apparatus according to the first embodiment of the invention will be explained initially with reference to the drawings.

Figure 1:
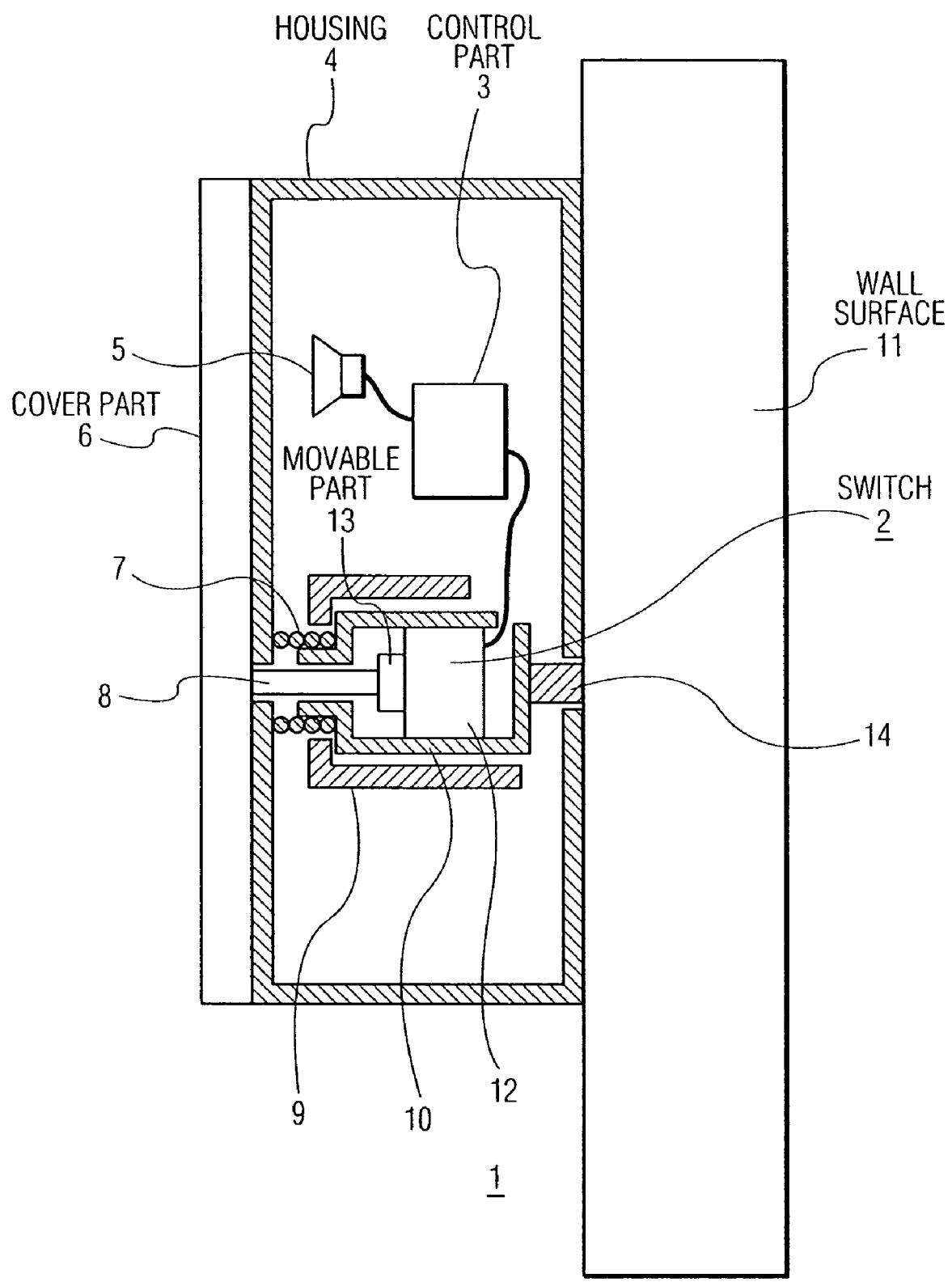
FIG. 1 is a view showing a construction of an information apparatus according to a first embodiment of the invention.

FIG. 1 is a view showing a construction of the information apparatus according to the first embodiment of the invention when it is used ordinarily.

Housing 4 of information apparatus 1 according to the first embodiment of the invention is fixed to a predetermined surface (hereinafter explained as wall surface 11) of a support substrate such as a wall by use of known fitting means such as screws (not shown in the drawings).

Cover part 6 is fitted in such a fashion as to cover a hole formed on the left side of housing 4 in FIG. 1 and the inside of housing 4 cannot be seen from outside of information apparatus 1. Cover part 6 is fitted to housing 4 by use of well known fitting means such as a screw or a lock (not shown in the drawing). Switch 2 including pole-like movable part 13 and cylindrical fixed part 12 into which movable part 13 is pushed is provided as an abnormal detector inside housing 4.

Figure 2:
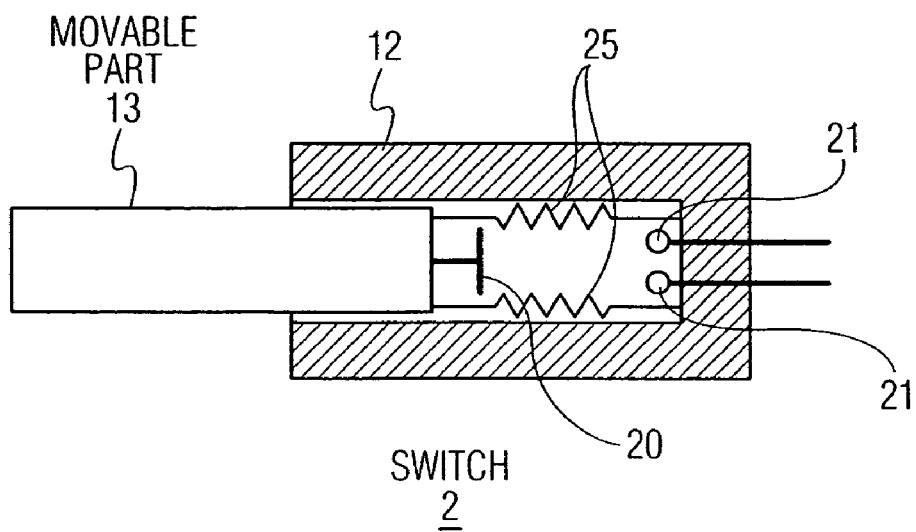
FIG. 2 is a view showing an example of a construction of a switch in the information apparatus according to the first embodiment of the invention.

Here, a construction of switch 2 in information apparatus 1 according to the first embodiment of the invention will be explained in detail. FIG. 2 is a view showing an example of switch 2 of information apparatus 1 according to the first embodiment of the invention.

As shown in FIG. 2, switch 2 includes pole-like movable part 13 and cylindrical fixed part 12 into which movable part 13 is pushed. Movable part 13 is allowed to move on a substantially concentric axis relative to fixed part 12.

Movable part side contact 20 is disposed on movable part 13 on the right side in FIG. 2 and a pair of fixed part side contacts 21 is disposed on a surface opposing the surface on which the movable part side contact 20 is disposed.

When no external force is imparted, movable part 13 is held by resilient force of known resilient means 25 such as a spring under the state where it is moved to the left in FIG. 2 and electric conduction is not established between fixed part side contacts 21. When movable part 13 is pushed into fixed part 12 by any external force (when it moves to the right in FIG. 2), on the other hand, movable part side contact 20 and fixed part side contact 21 come into mutual contact and electric conduction is established between fixed part side contacts 21. In this case, since movable part 13 moves on substantially the same axis with respect to fixed part 12, contact can be reliably established between movable part side contact 20 and fixed part side contact 21.

Turning back again to FIG. 1, protuberance part 8 is disposed inside cover part 6. Protuberance part 8 is held through opening of housing 4 opened on the left side of the sheet of the drawing in FIG. 1 under a state where movable part 13 of switch 2 is biased to the right in FIG. 1 and is pushed into fixed part 12, that is, under a state where movable part side contact 20 and fixed part side contact 21 keep mutual contact.

Here, since fixed part 12 of switch 2 is fitted to holder part 10 by a known method such as a method using an adhesive, fixed part 12 operates integrally with holder part 10. Guide part 9 keeps holder part 10 in such a fashion that holder part 10 can move in a predetermined direction (in the horizontal direction in FIG. 1). In other words, fixed part 12 and holder part 10 are movable with respect to housing and when movable part 13 is a first movable part, they constitute a second movable part.

A left-hand part (one of ends) of holder part 10 in FIG. 1 is elastically held by coil spring 7. Protuberance part 14 is defined on the right-hand part (the other end side) of holder part 10 in FIG. 1. When protuberance part 14 is fitted to wall surface 11 of housing 4, the other end side of protuberance part 14 is biased to wall surface 11 through the opening defined in housing 4 and is held under the state where it is moved to the left in FIG. 1. In other words, each of holder part 10 and fixed part 12 is elastically held at one of the ends by coil spring 7 and is held at the other end by wall surface 11 under the state where it is biased to the left in FIG. 1.

The length of protuberance part 8 is controlled in such a fashion that movable part 13 of switch 2 can be pushed into fixed part 12 to thereby establish conduction between the terminals of switch 2 under the state where cover part 6 is fitted to housing 4 and protuberance part 14 is biased by wall surface 11 to the left in FIG. 1.

As described above, when information apparatus 1 according to the first embodiment is ordinarily used, switch 2 is under the conduction state but when conduction of switch 2 is cut off, control part 3 connected to switch 2 detects this cut-off of conduction of switch 2 and causes alarm generation part 5 to raise an alarm.

According to the construction described above, conduction of switch 2 is cut off when disconnection of a cable connecting switch 2 and control part 3 and failure of switch 2 occur. Therefore, it is possible to detect abnormality and to raise an alarm.

Figure 3:
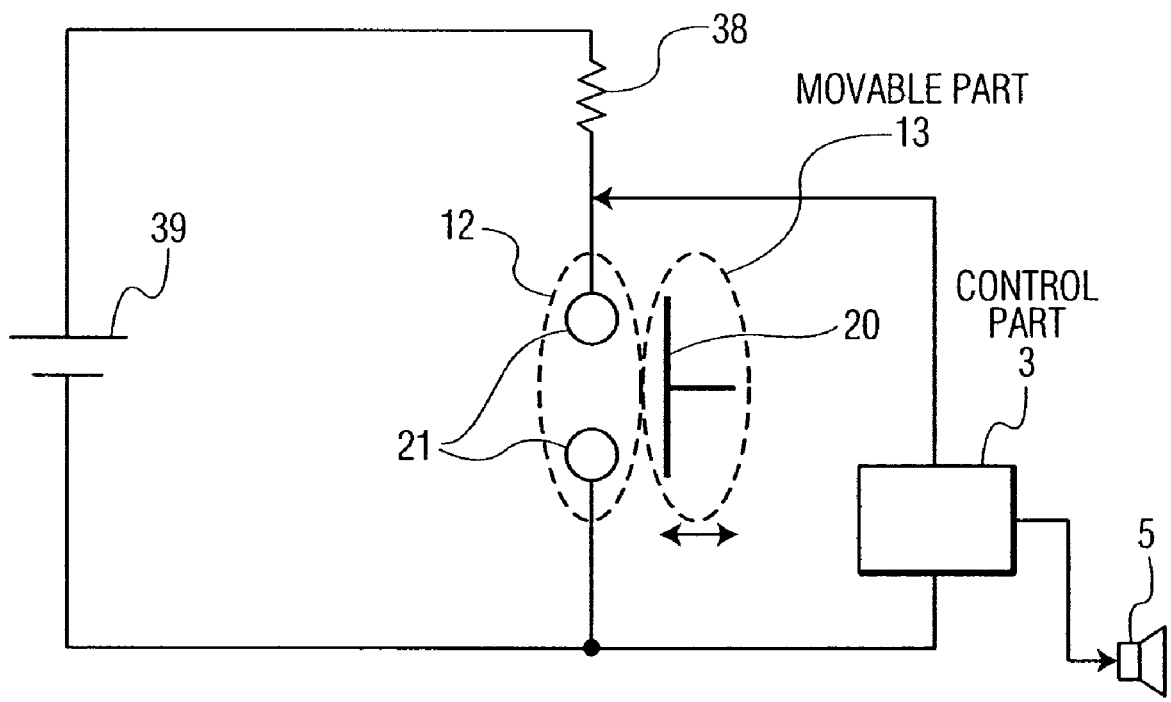
FIG. 3 is a view showing an example of a circuit construction for detecting conduction of the switch in the information apparatus according to the first embodiment of the invention.

To conduct such detection, a circuit shown in FIG. 3, for example, may well be formed. FIG. 3 shows an example of a circuit construction for detecting conduction of switch 2 in information apparatus 1 according to the invention. As shown in FIG. 3, a predetermined voltage is applied across both ends of fixed part side contact 21 of switch 2 and control part 3 is connected to each of fixed part contacts 21 of switch 2 to measure a potential difference between them.

According to the construction described above, movable part side contact 20 and fixed part side contact 21 of switch 2 keep contact with each other during ordinary use as described above and the potential difference does not occur between fixed part side contacts 21. In this case, control part 3 detects the potential difference=0 and judges that the state is the ordinary state. When tampering is made as will be later described and movable contact part side contact 20 and fixed part side contact 21 are spaced apart from each other, the current does not flow between fixed part side contacts and a predetermined potential difference develops. Control part 3 detects the occurrence of this potential difference, judges the state as being abnormal and causes alarm generation part 5 to raise an alarm. Power source 39 and resistor 38 are arranged in the circuit as shown in FIG. 3.

Next, the operation when cover part 6 is opened in information apparatus 1 in the first embodiment of the invention will be explained with reference to FIG. 4.

Figure 4:
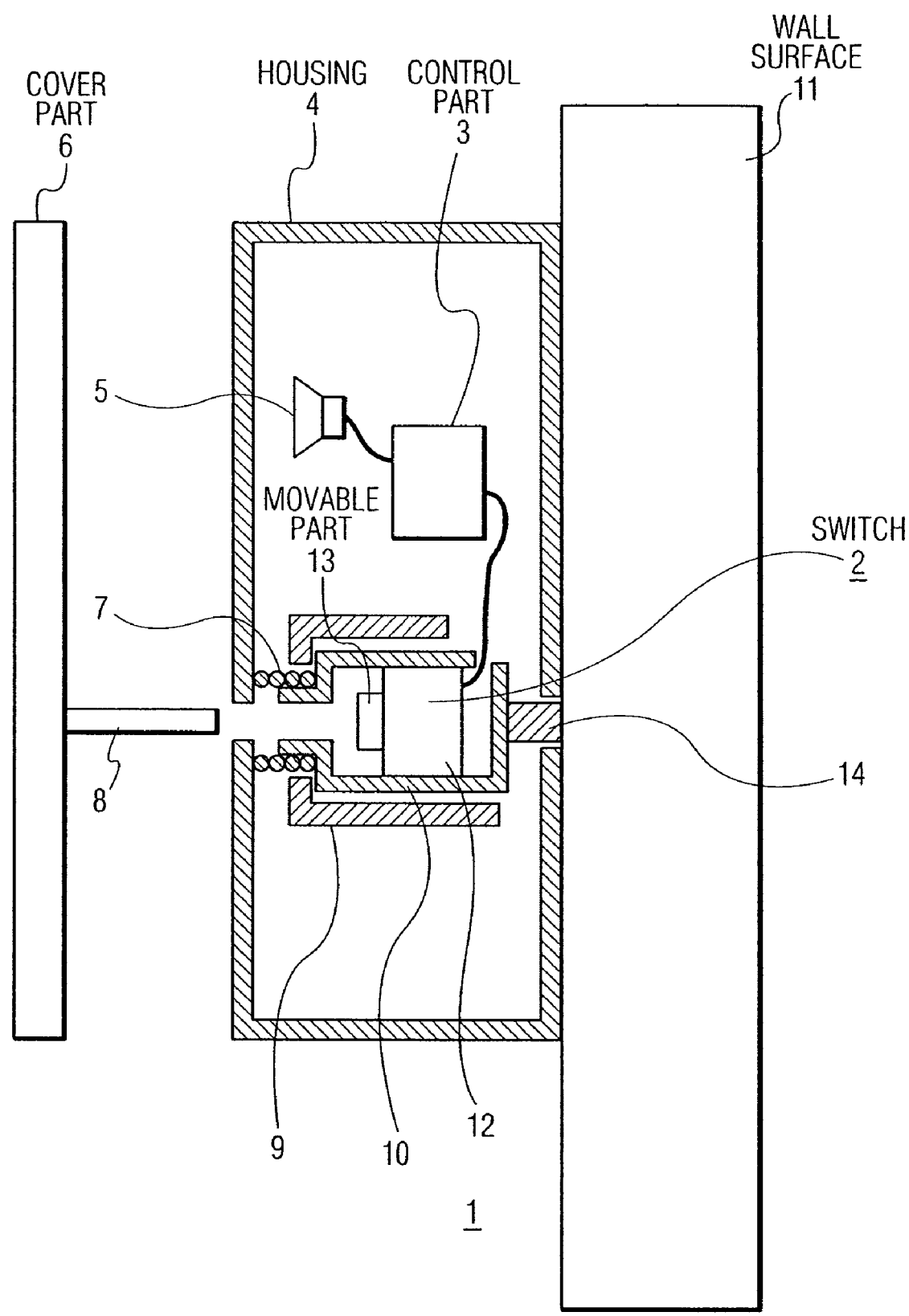
FIG. 4 is a view showing a construction when a cover part of the information apparatus according to the first embodiment of the invention is opened.

FIG. 4 shows the construction when cover part 6 of information apparatus 1 in the first embodiment of the invention is opened. Under the state where cover part 6 is opened, protuberance part 8 of cover part 6 and movable part 13 of switch 2 are spaced apart from each other. In consequence, movable part 13 moves to the left in FIG. 4, thereby cutting off conduction of switch 2. Control part 3 detects cut-off of conduction of switch 2 by the method described above and causes alarm generation part 5 to raise an alarm.

Since fixed part 12 and holder part 10 of switch 2 are integrally held as described above, holder part 10 is resiliently held at one of its ends (left-hand portion in the sheet of the drawing in FIG. 4) by coil spring 7 and protuberance part 8 can reliably come off from holder part 10 and can be spaced apart from movable part 13.

Because of the construction described above, information apparatus 1 according to the first embodiment of the invention can reliably raise an alarm when cover part 6 is opened.

Figure 5:
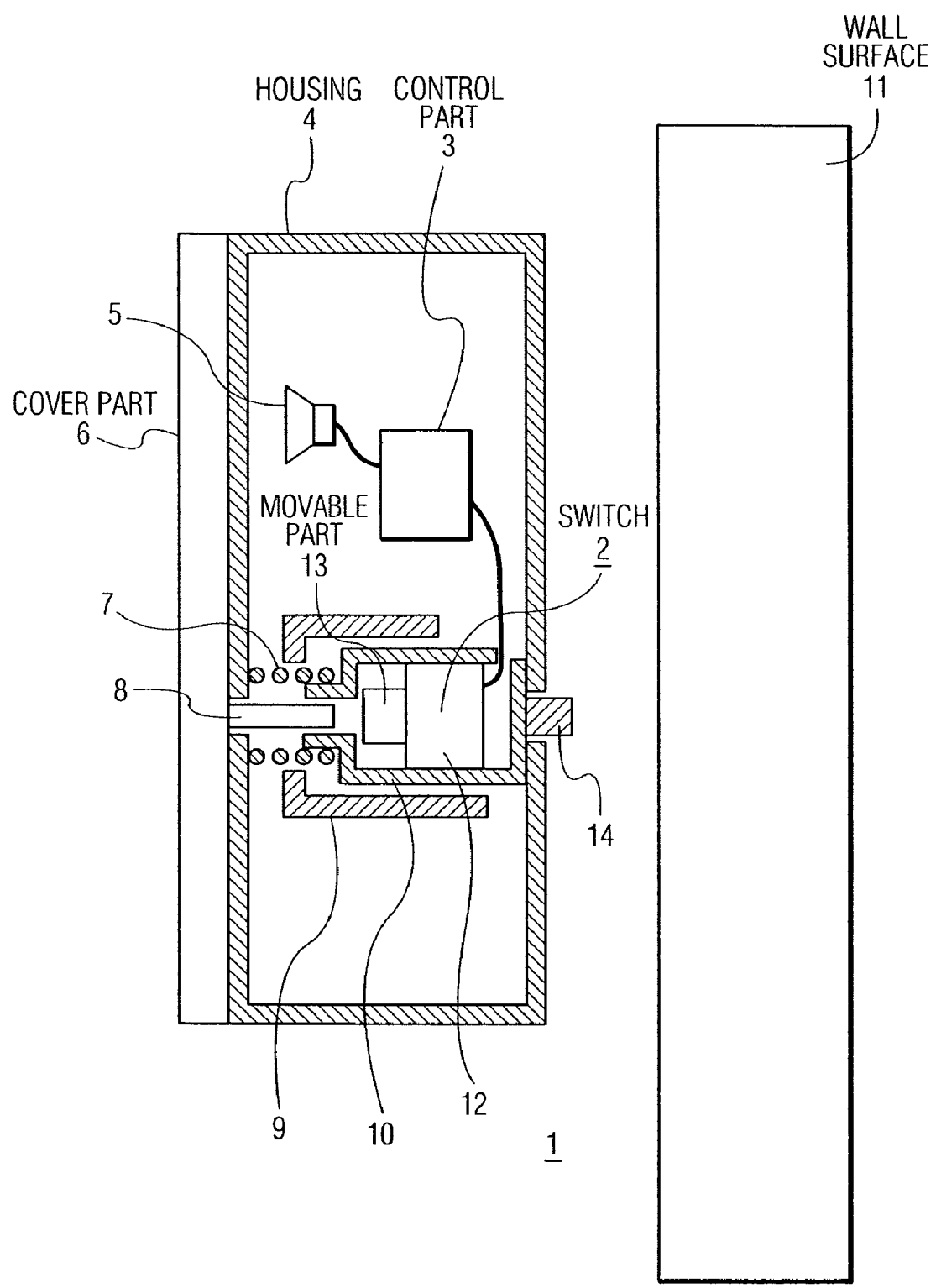
FIG. 5 is a view showing a construction when a housing of the information apparatus according to the first embodiment of the invention is removed.

Furthermore, the information apparatus of the invention can raise an alarm when housing 4 is removed from wall surface 11, too. This construction will be explained with reference to FIG. 5. FIG. 5 is a view showing the state where housing 4 is removed from wall surface 11 in information apparatus 1 according to the first embodiment of the invention.

Referring to FIG. 5, when housing 4 is removed from wall surface 11, protuberance part 14 disposed on the right side of holder part 10 in FIG. 5 is spaced apart from wall surface 11, holder part 10 and fixed part 12 are moved to the right in FIG. 5 by resilient force of coil spring 7 and protuberance part 8 and movable part 13 are spaced apart from each other, thereby cutting off conduction of switch 2. Protuberance part 14 protrudes from housing 4 and control part 3 detects cut-off of conduction of switch 2 as described above and causes alarm generation part 5 to raise an alarm.

In such a construction, when information apparatus 1 according to the first embodiment of the invention is employed, it is possible to raise an alarm when cover part 6 is opened and also when housing 4 is removed from wall surface 11.

In the first embodiment of the invention, the construction of switch 2 has been explained about the case where conduction is established when pole-like movable part 13 as shown in FIG. 2 is pushed into fixed part 12. However, the switch in the information apparatus according to the first embodiment of the invention is not limited to such a construction but can be applied to all switches having a movable part and a fixed part. FIG. 6 shows another construction of the switch of the information apparatus in the embodiment of the invention. Like reference numerals are used to identify like constituent elements having like constructions as in switch 2 shown in FIG. 2 and the explanation of such constituent elements will be omitted to simplify the explanation.

Figure 6A:
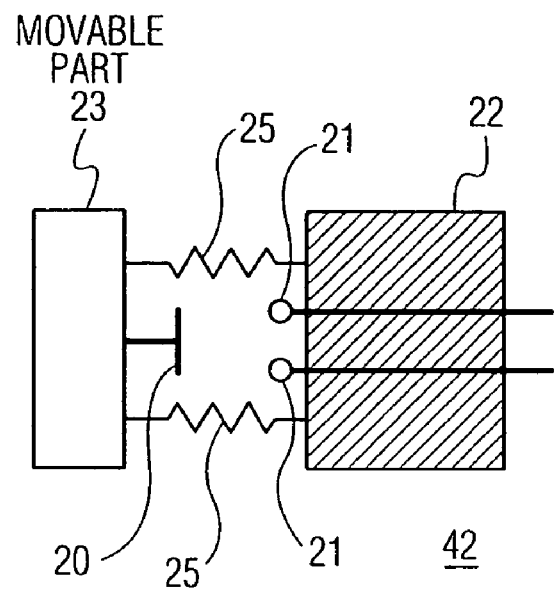
FIG. 6 is a view showing another example of the switch of the information apparatus according to the first embodiment of the invention.

Switch 42 shown in FIG. 6(a) has a construction where sheet-like movable part 23 is pushed to fixed part 22 to establish conduction. Fixed part side contacts 21 are disposed on a surface of fixed part 22 opposing movable part 23 and movable part side contact 20 is provided to a surface of movable part 23 opposing fixed part 22.

In switch 42, resilient means 25 urges movable part 23 to the left in FIG. 6(a) and movable part side contact 20 and fixed part side contact 21 are spaced apart from each other. Therefore, fixed part side contacts 21 are not conductive with each other. Movable part 23 is pushed by external force to the right in the drawing and comes into contact with fixed part 22. As a result, movable part side contact 20 and fixed part side contact 21 come into mutual contact and conduction is established between fixed part side contacts 21.

Figure 6B:
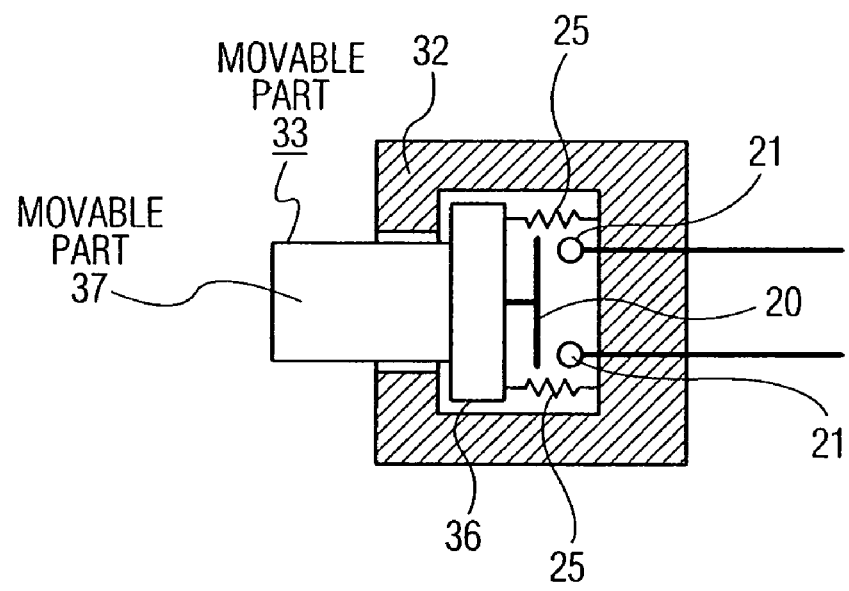

Next, switch 52 shown in FIG. 6(b) is a well known so-called "push switch" that has a construction in which movable part 33 does not come off from fixed part 32. This construction is suitable when switch 52 is used repeatedly. Movable part 33 has pole part 37 having a diameter smaller than that of hole of fixed part 32 and holding part 36 having a diameter greater than that of the hole of fixed part 32. Because holding part 36 does not come off from the hole of fixed part 32, movable part 33 does not come off from fixed part 32 but is retained.

In switch 52, too, resilient means 25 urges movable part 33 to the left in FIG. 6(b) and movable part side contact 20 and fixed part side contact 21 are spaced apart from each other. Therefore, conduction is not established between fixed part side contacts 21. When external force pushes movable part 33 to the right in FIG. 6(b), movable part side contact 20 and fixed part side contact 21 come into mutual contact and conduction is established between fixed part side contacts 21.

In information apparatus 1 according to the first embodiment of the invention, when a storage part (not shown) storing information is connected to control part 3 and control part 3 detects cut-off of conduction of switch 2, control part 3 causes alarm generation part to raise an alarm and erases information stored in the storage part. It is thus possible to constitute an information apparatus that can prevent leak of information and has high security.

When the abnormality detector of the invention is mounted to an authentication apparatus which stores authentication information including password information and biometrix information such as a fingerprint pattern, an iris pattern or a face pattern stored in a storage part, an authentication apparatus having high security can be constituted.

Both when an unauthentic person opens the cover part and when the unauthentic person removes the housing from the wall surface, the information apparatus according to the first embodiment of the invention described above can generate the alarm and can therefore provide an information apparatus having high security.

(Second Embodiment)

Next, another example of the abnormality detector will be explained as the second embodiment of the invention.

Figure 7:
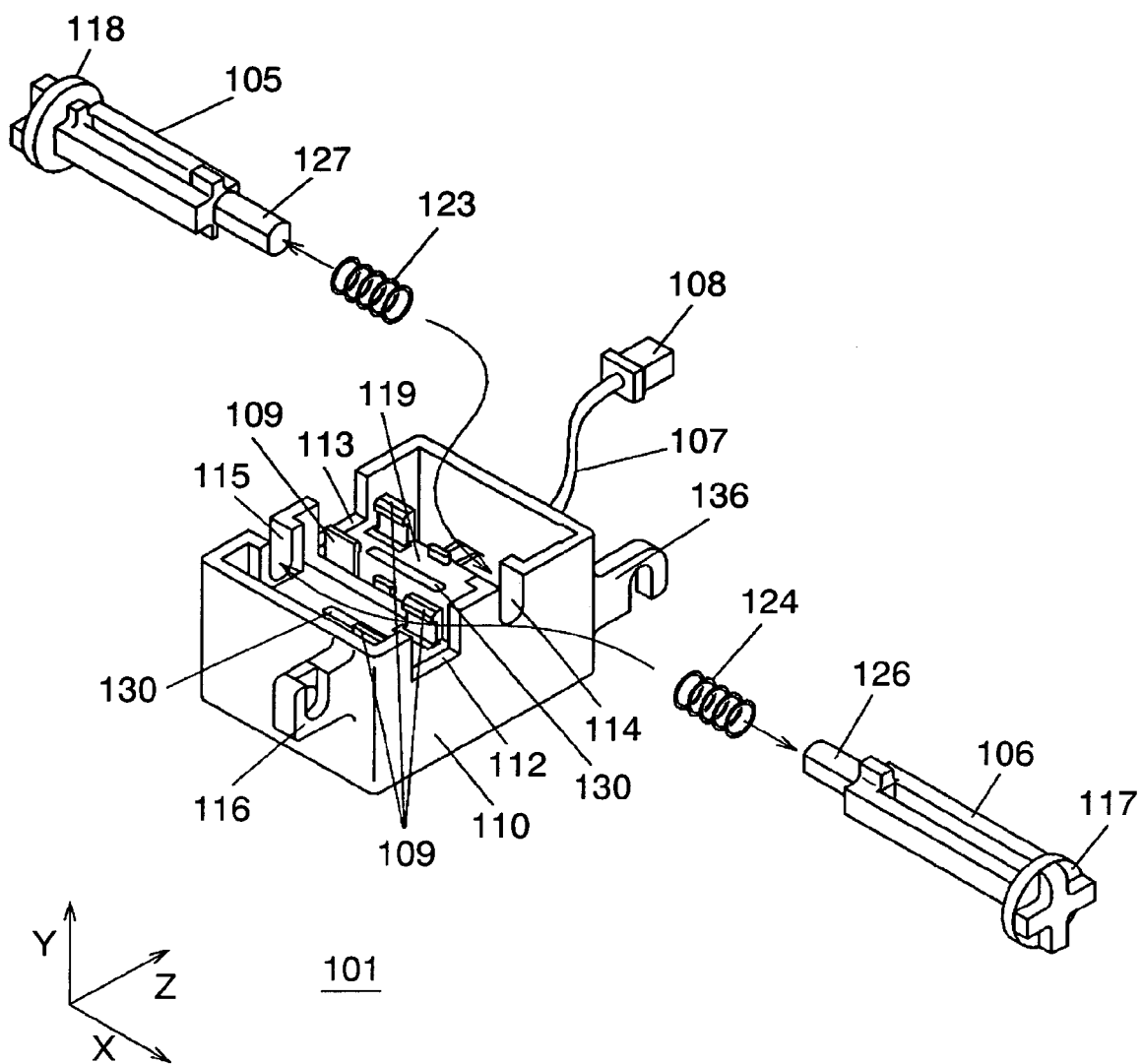
FIG. 7 is an exploded perspective view showing a construction when an abnormality detector according to a second embodiment of the invention is viewed from a surface.
Figure 8:
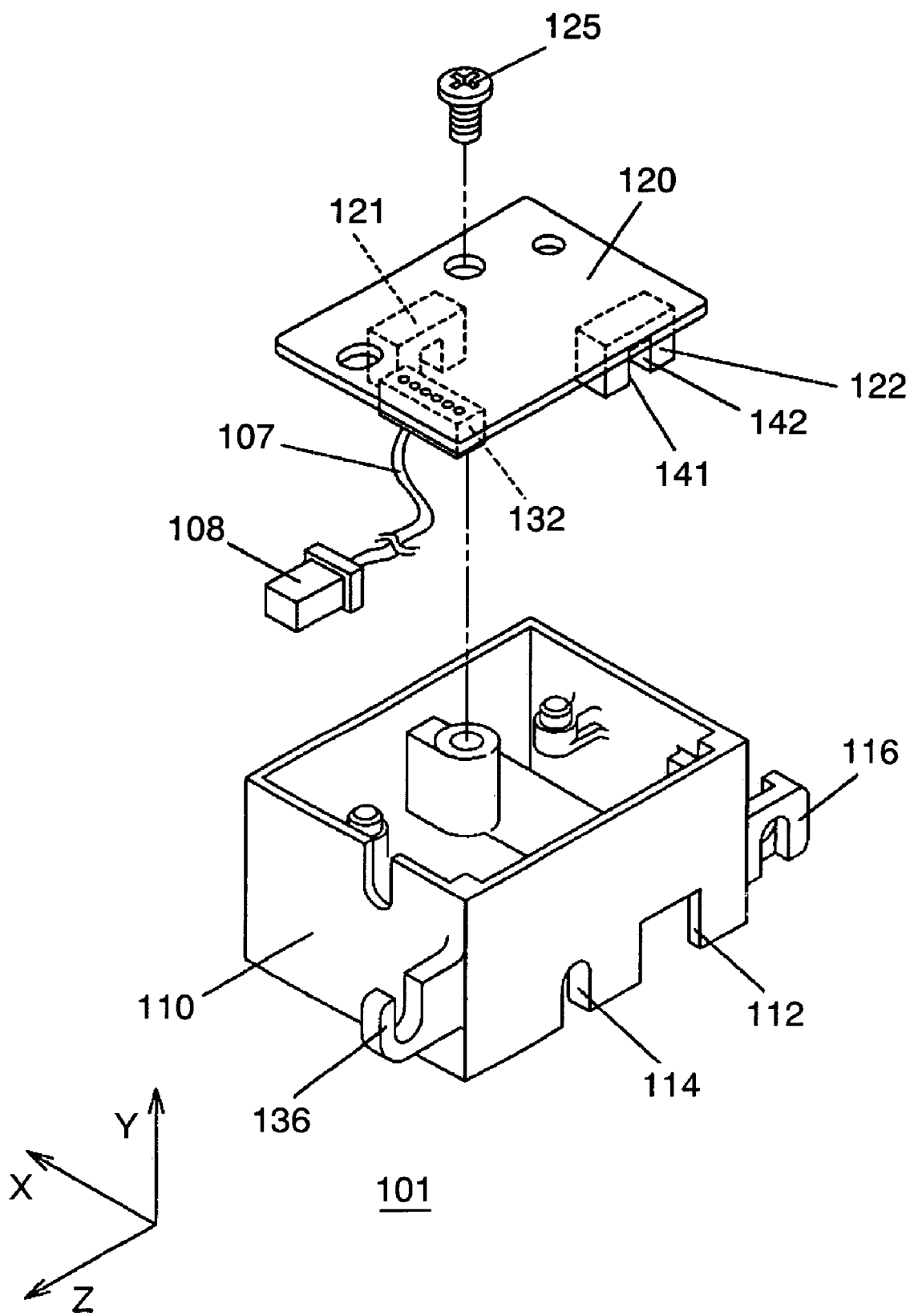
FIG. 8 is an exploded perspective view showing a construction when the abnormality detector according to the second embodiment of the invention is viewed from back.

FIG. 7 is an exploded perspective view showing a construction of the abnormality detector according to the second embodiment of the invention when it is viewed from the surface and FIG. 8 is an exploded perspective view showing a construction of the abnormality detector according to the second embodiment of the invention when it is viewed from the back.

First, as shown in FIG. 7, abnormality detector 101 according to the invention includes pole-like first and second light shading parts 105 and 106 that are so disposed as to slide in auniaxial direction (X-axis direction in FIG. 7 and direction opposite to the former) on slide surface 119 of base part 110. First light shading part 105 has holder part 127 formed at one of the ends thereof and pushed portion 118 to be pushed by an external structure (support substrate such as later-appearing cover part or wall) at the other end. Second light shading part 106, too, has holder part 126 formed at one of the ends thereof and pushed portion 117 at the other end. As shown in FIG. 7 and later-appearing FIG. 9, too, it is preferred to form an end face of each pushed part 118 and 117 into a curve surface or to form it into a substantial crisscross shape as shown in FIG. 7 so as to reduce a contact area with the cover part or the wall surface and to reduce the frictional force with the support substrate such as the cover part or the wall.

Holder part 127 of first light shading part 105 and holder part 126 of second light shading part 106 are held by recess parts 114 and 115 formed in base part 110, respectively. The parts of the first and second light shading parts 105 and 106 opposite to their holder parts 127 and 126 are held by notch parts 113 and 112 formed in base part 110, respectively. First and second light shading parts 105 and 106 are fitted in this way to base part 110.

Each of coil springs 123 and 124 is fitted to one of the ends of each of holder parts 127 and 126 of first and second light shading parts 105 and 106. Resilient force of this coil spring 123 urges first light shading part 105 in the first direction, that is, a direction opposite to the X direction in FIG. 7 and resilient force of coil spring 124 urges second light shading part 106 in the second direction, that is, the X direction in FIG. 7.

Guide part 109 disposed in base part 110 restricts movement of first and second light shading parts 105 and 106 in the transverse direction (Z-axis direction in FIG. 7) and in the longitudinal direction (Y-axis direction in FIG. 7) and consequently, first and second light shading parts 105 and 106 slide in the uniaxial direction (X-axis direction and direction opposite to former in FIG. 7).

Figure 9:
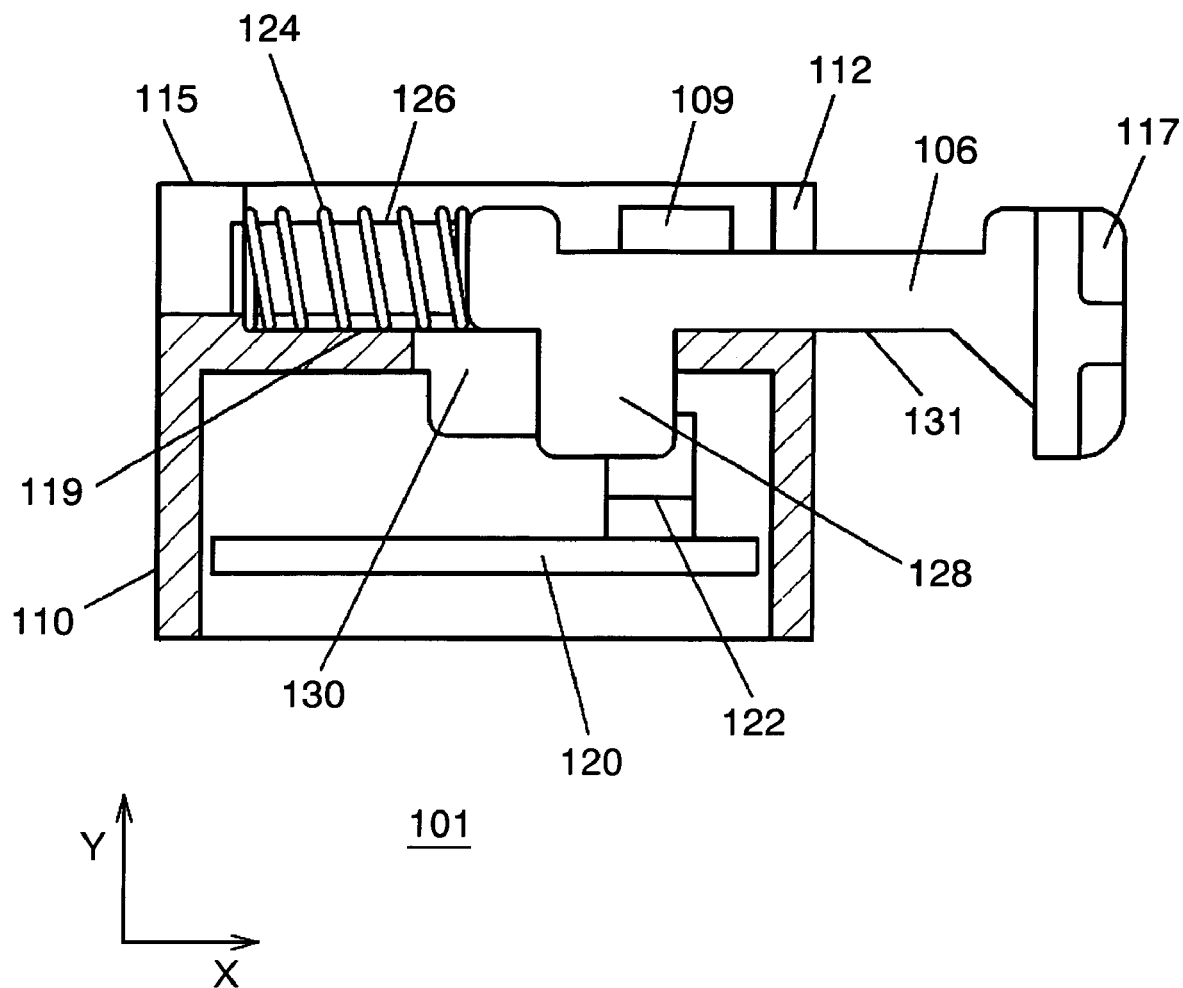
FIG. 9 is a view showing a construction under the state where a second light shading part is fitted to a base part in the second embodiment of the invention.

Next, the relation between first light shading part 105 and first light reception/emission part 121 and the relation between second light shading part 106 and second light reception/emission part 122 will be explained with reference to FIG. 9 about the relation between second light shading part 106 and second light reception/emission part 122 by way of example. FIG. 9 is a view showing a construction under a state where second light shading part 106 in the second embodiment of the invention is fitted to base part 110. FIG. 9 shows the construction of abnormal detector 101 when tampering is deemed as being detected.

As shown in FIG. 9, second light shading part 106 is arranged on slide surface 119 of base part 110. Groove part 130 is formed in slide surface 119 and protuberance part 128 formed in the lower surface of second light shading part 106 in FIG. 9 is arranged inside groove part 130. Protuberance part 128 is positioned below slide surface 119 in FIG. 9 and when tampering is detected as shown in FIG. 9, protuberance portion 128 moves to a position between light emission part 141 and light reception part 142 of second light reception/emission part 122 similarly positioned below slide surface 119 and turns OFF the output from second light reception/emission part 122. In this construction, since second light shading part 106 and second light reception/emission part 122 are spaced apart through slide surface 119, it is possible to reduce the possibility that dust, etc, occurring when second light shading part 106 slides on slide surface 119 mixes between light emission part 141 and light reception part 142 of second light reception/emission part 122 and invites an erroneous operation.

It is also possible to employ a construction in which protuberance portion 131 extending in the axial direction is formed in a surface that comes into contact with slide surface 119 of second light shading part 106 in order to reduce friction at the time of sliding. According to such a construction, the surface of the top of protuberance part 131 having a smaller area comes into contact and slides than when the entire surface of slide surface of second shading part 106 comes into contact and slides. Therefore, friction between slide surface 119 and second light shading part 106 can be reduced.

Turning back again to FIG. 8, abnormality detector 101 of the invention includes first and second light reception/emission parts 121 and 122 each having a pair of light reception part 142 and a light emission part 141 on a substrate 120, circuit part 132 connected to first and second light reception/emission parts 121 and 122 and outputting an abnormality signal when the output of at least one of first and second light reception/emission parts 121 and 122 is turned OFF, and a cable part 107 for sending the output from circuit part 132 to the outside. Connector part 108 is disposed at the distal end of cable part 107 to connect abnormal detector 101 to external apparatuses.

Substrate 120 is fixed to base part 110 through screw 125.

Base part 110 is fixed inside an external apparatus as boss parts 116 and 136 formed at its ends are fixed by screws in housing of the external apparatus.

During normal use in which tampering is not detected in abnormality detector 101 according to the second embodiment of the invention, pushed part 117 of second light shading part 106 is urged by the door, the cover or the wall surface to the left in the sheet of FIG. 9 (direction opposite to X direction) as will be explained later and second light shading part 106 and protuberance part 128 move in the direction opposite to the X direction in FIG. 9. Since second light shading part 106 is positioned outside the position between light emission part 141 and light reception part 142 of second light reception/emission part 122, the rays of light from light emission part 141 of second light reception/emission part 122 are received by light reception part 142 and the output from second light reception/emission part 122 is turned ON. When tampering is detected in abnormality detector 101 according to the second embodiment of the invention, on the other hand, the urging force to second light shading part 106 to the left in the sheet in FIG. 9 is released and is urged instead by resilient force of coil spring 124 to the right (X direction) in FIG. 9. Second light shading part 106 moves to the right in FIG. 9 and protuberance part 128 moves to a position at which it cuts off light between light emission part 141 and light reception part 142 of second light reception/emission part 122. Consequently, the output from second light reception/emission part 122 is turned OFF.

The relation between first light shading part 105 and first light reception/emission part 121 is the same as the relation between second light shading part 106 and second light reception/emission part 122. Since first light shading part 105 is constituted in the opposite direction to second light shading part 106, however, it is urged to the right (X direction) in the sheet of drawing in FIG. 9 and when tampering is detected, it is urged to the left (direction opposite to X direction) in the sheet of drawing by resilient force of coil spring 123, so that first light shading part 105 and protuberance part 129 move to the left in the sheet of drawing (opposite to X direction). This point is different.

As described above, abnormality detector 101 according to the second embodiment of the invention outputs the abnormality signal during normal use when the outputs from first and second light emission/reception parts 121 and 122 are ON and when the output of at least one of first and second light reception/emission parts 121 and 122 changes to OFF. Therefore, when at least one of first and second light reception/emission parts 121 and 122 gets into trouble during normal use, its output changes from ON to OFF with the result that the abnormality signal is generated and the trouble can be detected.

The second embodiment of the invention uses coil springs 123 and 124 as the resilient means but abnormality detector 101 of the second embodiment of the invention is not limited thereto but can of course use all known resilient means having resilient force such as a leaf spring, rubber, and so forth.

The second embodiment of the invention represents the construction in which first and second light shading parts 105 and 106 slide on the slide surface 119. However, abnormality detector 101 of the second embodiment of the invention is not limited to this construction and may of course be applied to a construction in which the slide surface 119 does not exist and first and second light shading parts 105 and 106 are retained by notch parts 112 and 113, recess parts 114 and 115, guide part 109, and so forth.

The second embodiment of the invention represents the example where first and second light shading parts 105 and 106 are arranged in parallel with each other and are movable in the mutually opposite directions but the abnormality detector and the information apparatus using the abnormality detector according to the invention are not limited thereto. For example, it is of course possible to employ a construction in which first and second light shading parts 105 and 106 are disposed at arbitrary angles and are movable in mutually different directions.

The second embodiment of the invention represents the case where the shading parts are two, that is, first and second light shading parts 105 and 106, but the abnormality detector and the information apparatus using the detector according to the invention is not limited thereto. For example, it is of course possible to employ a construction having three or more light shading parts.

(Third Embodiment)

Figure 10:
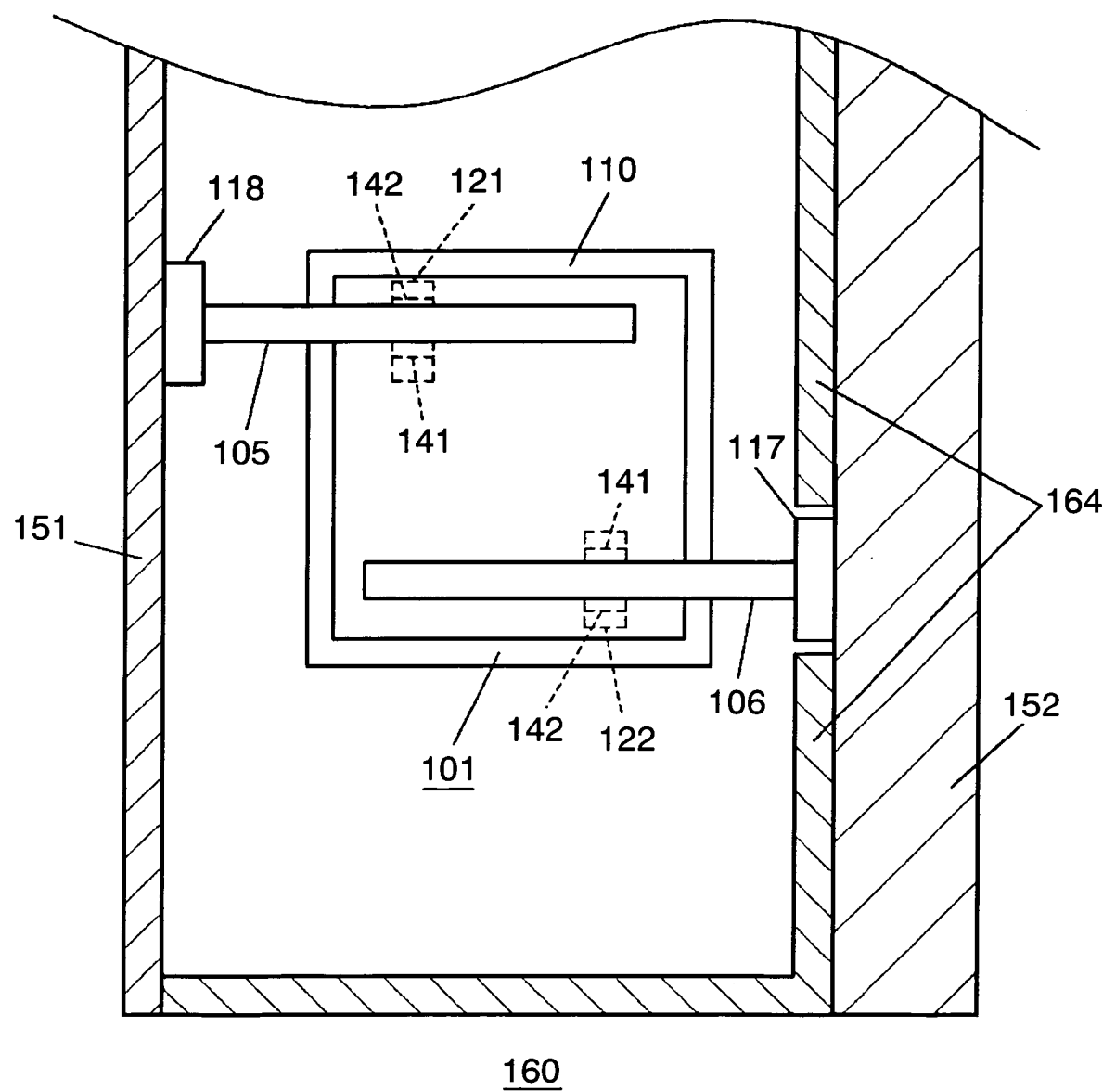
FIG. 10 is a view showing a part of a construction of an information apparatus according to a third embodiment of the invention.

Next, an information apparatus using the abnormality detector explained in the second embodiment of the invention will be explained as the third embodiment of the invention. FIG. 10 is a view showing a part of a construction of information apparatus 160 according to the third embodiment of the invention. Information apparatus 160 shown in FIG. 10 represents the construction during normal use when tampering is not detected. Abnormality detector 101 is held inside information apparatus 160 since pushed portion 118 of first light shading part 105 is urged to the right in FIG. 10 by cover part 151 of information apparatus 160. A hole is formed in housing 164 of information apparatus 160 and pushed part 117 of second light shading part 106 is urged to the left in FIG. 10 by wall surface 152. At this time, the outputs from both first and second light reception/emission parts 121 and 122 are kept ON as explained in the second embodiment.

According to such a construction, in information apparatus 160 using abnormality detector 101 of the second embodiment of the invention, first and second light shading parts 105 and 106 are urged in mutually different directions during normal use and abnormality is regarded as occurring when urging force of either one of them is released. Therefore, it is possible to constitute a construction for detecting tampering relative to a predetermined surface such as wall surfaces 152 arranged in a plurality of different directions and cover part 151 by use of one abnormality detector 1.

Information apparatus 160 to which abnormality detector 101 of the second embodiment of the invention is to be mounted can be applied broadly to various information apparatuses such as an authentication apparatus storing authentication information including a password, an iris pattern, a finger pattern and a face pattern, an entry/exist management apparatus, and so forth, so long as the apparatuses store information to be protected from tampering.

Figure 11:
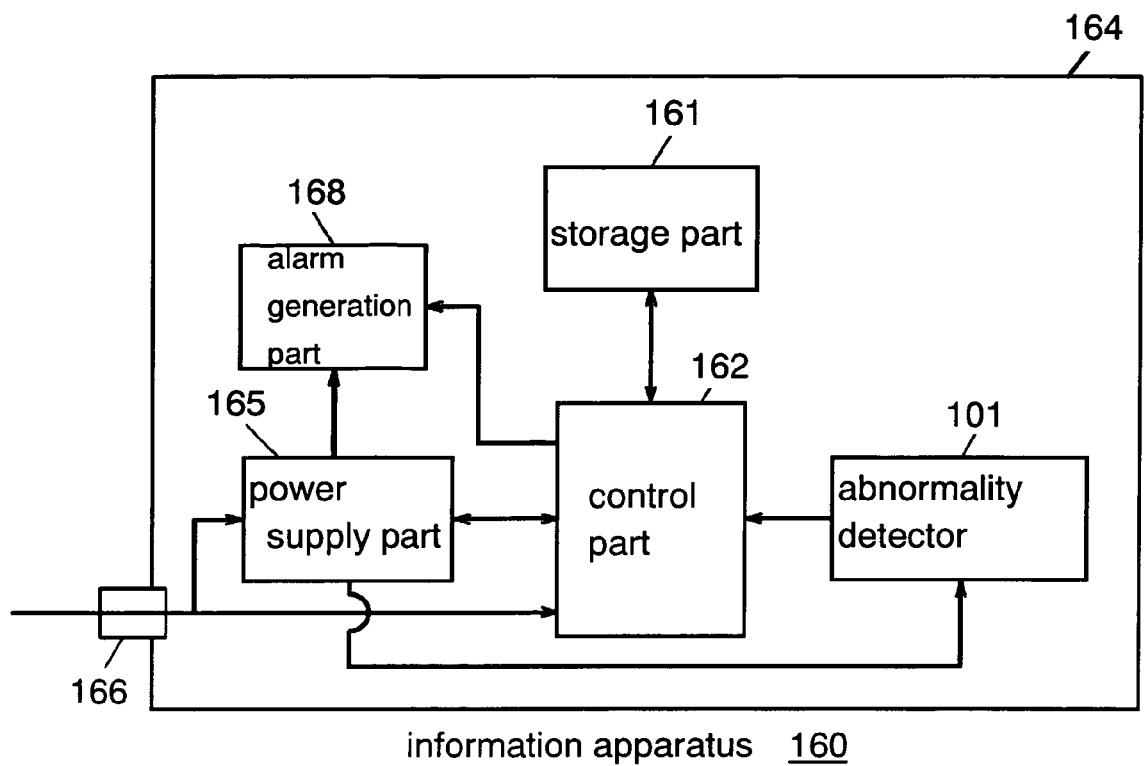
FIG. 11 is a block diagram showing the construction of the information apparatus according to the third embodiment of the invention.

Next, a construction of information apparatus 160 having abnormality detector 101 of the invention mounted thereto will be explained in further detail. FIG. 11 is a block diagram showing a construction of information apparatus 160 according to the third embodiment of the invention.

Information apparatus 160 according to the third embodiment of the invention includes, inside its housing 164, storage part 161 that stores information to be protected such as personal authentication information, control part 162 connected to storage part 161 and capable of erasing the information stored, abnormality detector 101 described already that is connected to control part 162 and generates the abnormality signal upon detection of tampering, alarm generation part 168 connected to control part 162 and raising an alarm when control part 162 generates the signal representing that tampering is detected and power supply part 165 for supplying power to alarm generation part 168, control part 162 and abnormality detector 101.

Power for driving is supplied from outside housing 164 to control part 162 and power supply part 165 through power supply port 166.

In information apparatus 160 according to the third embodiment of the invention, the kind of storage part 161 is not at all limited so long as storage part 161 can store and erase information. Therefore, it is possible to use various kinds of known devices such as a known RAM (random access memory), a known flash memory and a known HDD (hard disk drive).

When a device requiring power for driving is used as storage part 161, it is preferred to use a construction in which necessary power is supplied from power supply part 165 or from an external power source.

Furthermore, alarm generation part 168 is preferably of a type that generates an alarm by sound because it attracts surrounding attention but may be of a type that raises an alarm by use of light or vibration.

A known primary or secondary cell can be used as power supply part 165. It is also possible to use a construction in which a chargeable secondary cell is used as power supply part 165 and power supply part 165, too, is normally supplied with power from outside and is charged as shown in FIG. 11.

It is further possible to use a construction not having power supply part 165 inside information apparatus 160. When power supply part 165 is provided, however, power supply part 165 can supply power to control part 162 and to abnormality detector 101 even when the power source supplied from outside is first cut off before housing 164 is forced open. Accordingly, information apparatus 160 having higher security can be realized.

Next, the operation of information apparatus 160 according to the third embodiment of the invention will be explained.

In information apparatus 160 to which abnormality detector 101 described above is mounted, when housing 164 is removed as a whole from wall surface 152 or when cover part 151 is removed from housing 164 and the output from at least one of first and second light reception/emission parts 121 and 122 of abnormality detector 101 is turned OFF to thereby let abnormality detector 101 generate the abnormality signal, control part 162 regards this state as tampering and transmits to storage part 161 the signal representing that important information such as personal information stored in storage part 161 is to be erased.

When the cable extending from the first or second light reception/emission part 121 or 122 is disconnected or when the light reception part or the emission part and other part get into trouble, too, the output from the light reception/emission part is turned OFF. Therefore, it is possible to generate the abnormality signal and to detect the trouble.

Storage part 161 erases predetermined important information among information stored or all information stored. Further, a construction is preferably such that an instruction signal is sent from control part 162 to alarm generation part 168 so as to generate the alarm.

Consequently, even when information apparatus 160 is removed together with housing 164 from wall surface 152 or even when cover 151 is forced open from housing 164, information apparatus 160 can detect such tampering, can quickly erase important information stored in storage part 161 and can prevent theft.

When the power cable is cut in information apparatus 160 according to the third embodiment of the invention, it is possible to employ a construction in which, when control part 162 detects the stop of supply of power from outside, power is supplied from power supply part 165. In this instance, the construction may be of a type such that control part 162 causes alarm generation part 168 to raise the alarm.

According to this construction, even when the third party wanting to extract information cuts off in advance from outside the power cable for supplying power to information apparatus 160, important information stored inside can be prevented from theft.

Incidentally, it is further possible to employ a construction which does not include alarm generation part 168 inside information apparatus 160 but in which the abnormality signal generated from control part 162 is transmitted outside housing 164 through a network or the like to an alarm generation part and other terminals disposed outside and separately with the result that the alarm generation part and the terminals disposed outside generate the alarm or detect abnormality.

INDUSTRIAL APPLICABILITY

As described above, the abnormality detector and the information apparatus using the abnormality detector according to the invention have the effect that they can detect tampering when the housing itself of the information apparatus is removed or carried away from the wall surface in addition to the case where the cover of the information apparatus having the abnormality detector mounted thereto is removed. Therefore, they are useful as the abnormality detector for detecting abnormality such as theft and as the information apparatus using the abnormality detector that store information to be protected from theft and leak of personal information and authentication information.

The invention claimed is:

1. An information apparatus comprising:
 a housing fitted to a support substrate and having a hole portion on a surface opposing the support substrate;
 a cover part fitted to the housing; and
 an abnormality detection part disposed inside the housing, including a first movable part urged by first urging force by the cover part in a first direction approaching the substrate support and a second movable part urged in a second direction approaching the cover part by second urging force by the support substrate through the hole portion, and detecting abnormality when either one of the first and second urging forces is released.

2. An information apparatus according to claim 1, wherein the abnormality detection part includes a switch so constituted as to be conductive when both of the first and second urging forces are imparted but to be non-conductive when either one of the urging forces is not imparted, and detects abnormality in accordance with existence/absence of conduction of the switch.

3. An information apparatus according to claim 2, wherein the switch has a first contact at the first movable part and a second contact at the second movable part and is held under a state where the first contact and the second contact keep mutual contact.

4. An information apparatus according to claim 3, wherein the first movable part is resiliently held relative to the second movable part and the second movable part is resiliently held relative to the housing.

5. An information apparatus according to claim 2, wherein the first movable part of the switch is pole-like while the second movable part is cylindrical, conduction is established when the first movable part is pushed into the cylinder of the second movable part and conduction is not established when the first movable part is not pushed into the cylinder of the second movable part.

6. An information apparatus according to claim 1, wherein:
the abnormality detection part includes a first light reception/emission part and a second light reception/emission part each having a light emission part and a light reception part;
the first movable part is urged by first resilient means in the first direction and cuts off an optical path of the first light reception/emission part;
the second movable part is urged by second resilient means in the second direction and cuts off an optical path of the second light reception/emission part;
the first movable part moves to a position at which it does not cuts off the optical path of the first light reception/emission part when urged by external force stronger than the resilient force of the first resilient means in a direction opposite to the first direction;
the second movable part moves to a position at which it does not cuts off the optical path of the second light reception/emission part when urged by external force stronger than the resilient force of the second resilient means in a direction opposite to the second direction; and
the abnormality detection part detects abnormality when the optical path of at least one of the first and second light reception/emission parts is cut off.

7. An information apparatus according to claim 6, wherein:
the first movable part of the abnormality detection part includes a first support pole part and a first protuberance part for cutting off the optical path of the first light reception/emission part;
the second movable part of the abnormality detection part includes a second support pole part and a second protuberance part for cutting off the optical path of the second light reception/emission part;
the abnormality detection part has a support surface for supporting the first and second support pole parts;
the first and second light reception/emission parts are arranged on the support surface on the side opposite to the side where the first and second support pole parts are arranged, respectively; and
first and second groove parts are defined in the support surface, the first protuberance part moves inside the first groove part and the second protuberance part moves inside the second groove part.

8. An abnormality detector according to claim 7, wherein a protuberance part extending in an axial direction is formed on a surface to be contacted with the support surface of at least one of the first and second support pole parts of the abnormality detection part.

9. An information apparatus according to claim 6, wherein at least one of the first and second resilient means of the abnormality detection part is a coil spring.

10. An information apparatus according to claim 1, which further comprises an alarm generation part raising an alarm when the abnormality detection part detects abnormality.

11. An information apparatus as defined in claim 1, which further includes:
a storage part for storing information to be protected; and
a control part connected to the storage part and to the abnormality detection part;
wherein:
the control part erases the information to be protected, stored in the storage portion, when the abnormality detection part detects abnormality.

12. An information apparatus according to claim 11, wherein the information to be protected is biometrix information.

13. An abnormality detector including:
a first light reception/emission part and a second light reception/emission part each having a light emission part and a light reception part;
a first light shading part having first resilient means, urged by the first resilient means in a first direction and cutting off an optical path of the first light reception/emission part; and
a second light shading part having second resilient means, urged by the second resilient means in a second direction different from the first direction and cutting off an optical path of the second light reception/emission part;
wherein:
the first light shading part moves to a position at which it does not cut off the optical path of the first light reception/emission part when it is urged by external force stronger than urging force of the first resilient means;
the second light shading part moves to a position at which it does not cut off the optical path of the second light reception/emission part when it is urged by external force stronger than urging force of the second resilient means; and
the abnormality detector outputs an abnormality signal when the optical path of at least one of the first and second light reception/emission part is cut off.

14. An abnormality detector according to claim 13, wherein:
the first light shading part includes a first support pole part and a first protuberance part cutting off the optical path of the first light reception/emission part;
the second light shading part includes a second support pole part and a second protuberance part cutting off the optical path of the second light reception/emission part;
the abnormality detector has a support surface for supporting the first and second support pole parts;

the first and second light reception/emission parts are arranged on the side opposite to the side where the first and second support pole parts are arranged with respect to the support surface, respectively; and a first groove part and a second groove part are defined in the support surface, the first protuberance part moves inside the first groove part and the second protuberance part moves inside the second groove part.

15. An abnormality detector according to claim 14, wherein a protuberance part is formed in an axial direction on a surface to be contacted with the support surface of at least one of the first and second support pole parts.

16. An abnormality detector according to claim 13, wherein at least one of the first and second resilient means is a coil spring.

17. An information apparatus according to claim 3, wherein the first movable part of the switch is pole-like while the second movable part is cylindrical, conduction is established when the first movable part is pushed into the cylinder of the second movable part and conduction is not established when the first movable part is not pushed into the cylinder of the second movable part.

18. An information apparatus according to claim 4, wherein the first movable part of the switch is pole-like while the second movable part is cylindrical, conduction is established when the first movable part is pushed into the cylinder of the second movable part and conduction is not established when the first movable part is not pushed into the cylinder of the second movable part.

19. An information apparatus according to claim 7, wherein at least one of the first and second resilient means of the abnormality detection part is a coil spring.

20. An information apparatus according to claim 8, wherein at least one of the first and second resilient means of the abnormality detection part is a coil spring.

21. An abnormality detector according to claim 14, wherein at least one of the first and second resilient means is a coil spring.

22. An abnormality detector according to claim 15, wherein at least one of the first and second resilient means is a coil spring.

* * * * *